(12) United States Patent
Watts

(10) Patent No.: US 11,073,747 B1
(45) Date of Patent: Jul. 27, 2021

(54) STABILIZING CAMERA MOUNTING APPARATUS TO ENHANCE IMAGE QUALITY OF A RECORDED VIDEO

(71) Applicant: Titus Gadwin Watts, San Francisco, CA (US)

(72) Inventor: Titus Gadwin Watts, San Francisco, CA (US)

( * ) Notice: Subject to any disclaimer, the term of this patent is extended or adjusted under 35 U.S.C. 154(b) by 0 days.

(21) Appl. No.: 16/742,371

(22) Filed: Jan. 14, 2020

Related U.S. Application Data

(60) Provisional application No. 62/792,084, filed on Jan. 14, 2019.

(51) Int. Cl.
| | |
|---|---|
| *G03B 17/56* | (2021.01) |
| *F16M 11/18* | (2006.01) |
| *F16M 13/04* | (2006.01) |
| *F16M 11/12* | (2006.01) |
| *F16M 11/20* | (2006.01) |
| *F16M 11/04* | (2006.01) |

(52) U.S. Cl.
CPC ......... *G03B 17/561* (2013.01); *F16M 11/126* (2013.01); *F16M 11/18* (2013.01); *F16M 13/04* (2013.01); *F16M 11/048* (2013.01); *F16M 11/2014* (2013.01)

(58) Field of Classification Search
CPC ........ F16M 11/04; F16M 11/12; F16M 11/10; F16M 11/18
USPC ....................................................... 396/428
See application file for complete search history.

(56) References Cited

U.S. PATENT DOCUMENTS

| | | | | |
|---|---|---|---|---|
| 3,638,502 | A * | 2/1972 | Leavitt ................... | G01C 21/18 74/5.34 |
| 6,354,544 | B1 * | 3/2002 | Muzila ................. | F16M 11/105 248/177.1 |
| 6,424,804 | B1 * | 7/2002 | Johnson ................. | B64D 47/08 348/117 |
| 7,068,927 | B2 * | 6/2006 | Itzkowitz ............... | F16M 11/12 396/13 |
| 7,658,555 | B1 * | 2/2010 | Moilanen ............... | G01C 21/18 396/427 |
| 8,721,198 | B2 * | 5/2014 | Chapman ............. | G03B 17/561 396/428 |
| 2015/0285429 | A1 * | 10/2015 | Le .......................... | F16M 13/00 248/178.1 |

\* cited by examiner

*Primary Examiner* — Clayton E. LaBalle
*Assistant Examiner* — Kevin C Butler
(74) *Attorney, Agent, or Firm* — Plager Schack LLP; Mark H. Plager; Michael J. O'Brien

(57) ABSTRACT

A stabilizing mounting apparatus coupled to a camera to enhance image quality captured by the camera is provided. The mounting apparatus absorbs undesirable movement resulting from travel on an uneven terrain to maintain the camera in a stable position. The apparatus includes a base frame assembly having a plurality of bars coupled together, a first portion of the plurality of bars forming a H-shaped base, a second portion of the plurality of bars having a plurality of upright bars coupled to the H-shaped base, and a third portion of the plurality of bars having a plurality of upper frame bars connected together and coupled to the plurality of upright bars. The H-shaped base is designed to permit attachment of the camera thereto.

6 Claims, 5 Drawing Sheets

STABILIZING CAMERA MOUNTING APPARATUS TO ENHANCE IMAGE QUALITY OF A RECORDED VIDEO

RELATED APPLICATION

The application claims priority to provisional patent application U.S. Ser. No. 62/792,084 filed on Jan. 14, 2019, the entire contents of which is herein incorporated by reference.

BACKGROUND

The embodiments herein relate generally to camera mounts. More specifically, embodiments of the invention are directed to a stabilizing camera mounting apparatus that enhances image quality for recording a film or video.

Cinematographers and other professionals commonly use a mounting device for a camera during the production of film or television works. In many instances, the camera and mounting device are placed in a moving vehicle that is subject to erratic, unexpected and undesired movements, resulting from travel over bumps on the ground and uneven terrain. These movements diminish the image quality of the recorded video from the camera.

Several stabilizing camera mounting devices exist as disclosed in U.S. Pat. Nos. 8,721,198, 7,658,555 and 3,638,502. However, these camera mounting devices are undesirable because they comprise complex components that are bulky and/or expensive.

As such, there is a need in the industry for a stabilizing camera mounting apparatus to enhance recorded image quality that addresses the limitations of the prior art, which provides a simple and low-cost apparatus that effectively absorbs erratic and undesired movements of the camera when traveling over bumps or uneven terrain.

SUMMARY

In certain embodiments of the invention, a stabilizing mounting apparatus coupled to a camera to enhance image quality captured by the camera is provided. The mounting apparatus is configured to absorb undesirable movement resulting from travel on an uneven terrain to maintain the camera in a stable position. The stabilizing mounting apparatus comprises a base frame assembly comprising a plurality of bars coupled together, a first portion of the plurality of bars forming a H-shaped base and comprising a pair of side bars connected by a crossbar, a second portion of the plurality of bars comprising a plurality of upright bars comprising first ends and second ends, the first ends of the plurality of upright bars coupled to ends of the pair of side bars in the H-shaped base, and a third portion of the plurality of bars comprising a plurality of upper frame bars connected together and coupled to the second ends of the plurality of upright bars, wherein the crossbar of the H-shaped base of the base frame assembly is configured to permit attachment of the camera thereto, wherein the plurality of bars in the base frame assembly are configured to absorb the undesirable movement from the travel to maintain the attached camera in the stable position.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
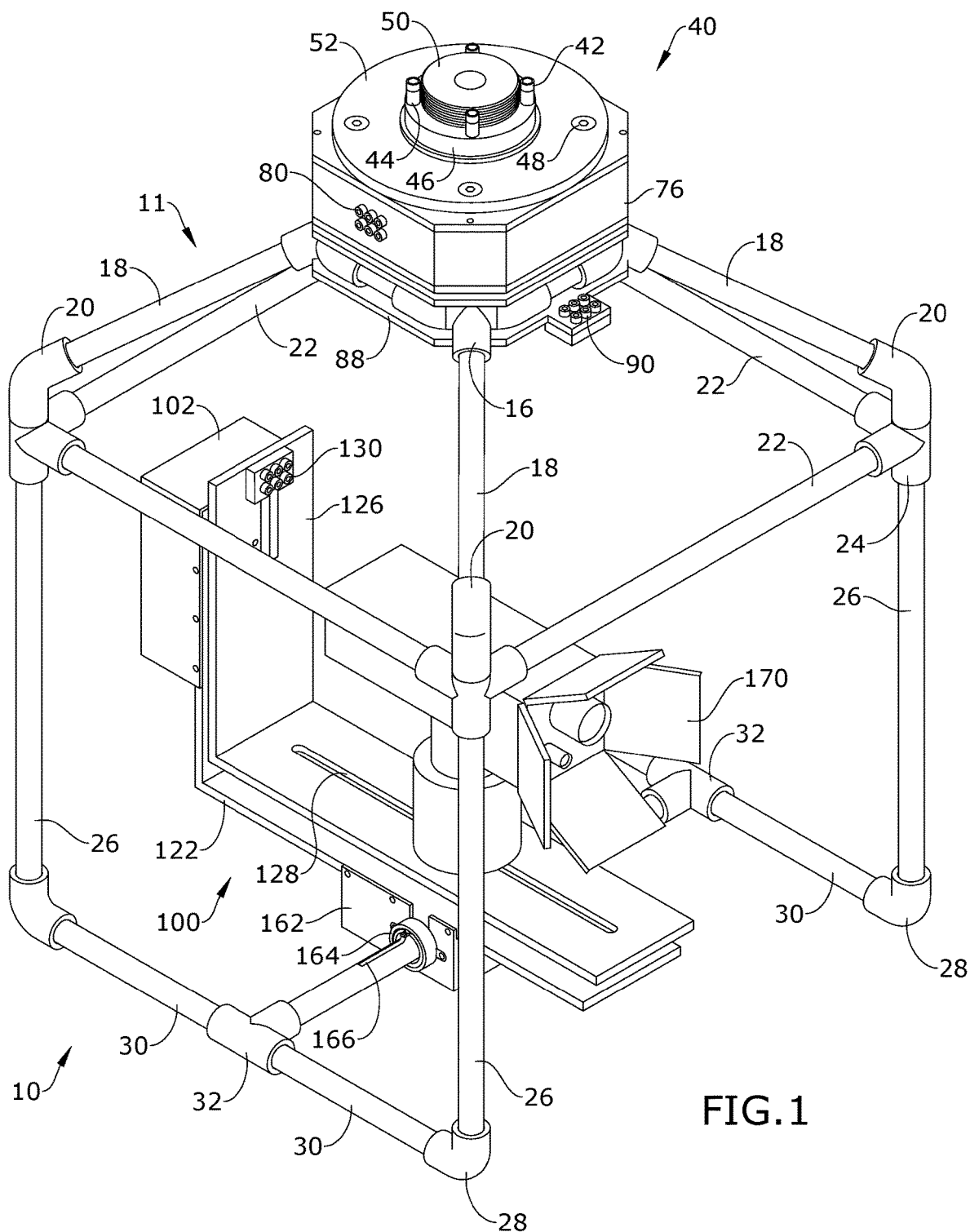
FIG. 1 depicts a perspective view of certain embodiments of the stabilizing mounting apparatus shown in use.
Figure 2:
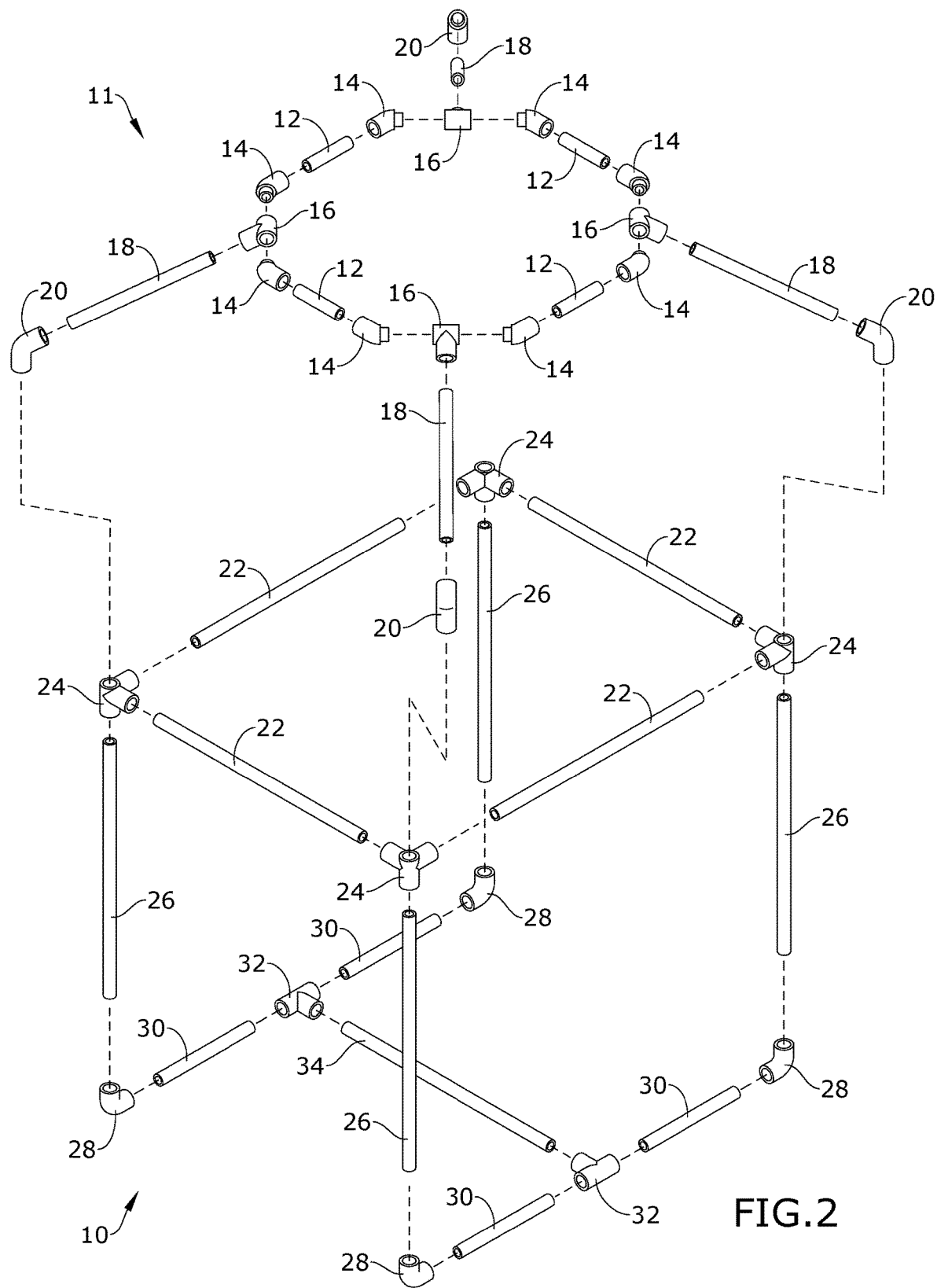
FIG. 2 depicts an exploded view of certain embodiments of the stabilizing mounting apparatus.
Figure 3:
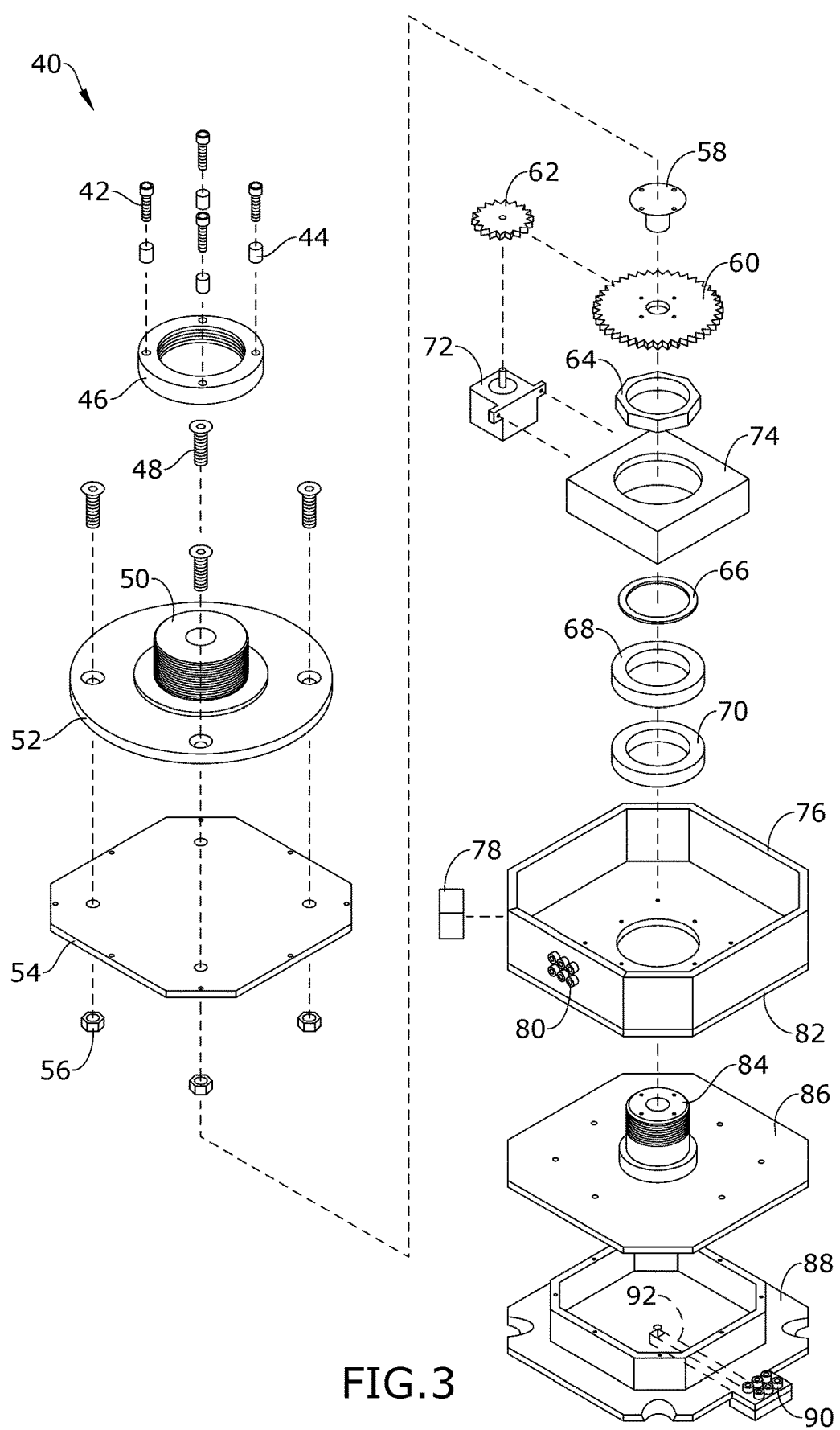
FIG. 3 depicts an exploded view of certain embodiments of the stabilizing mounting apparatus illustrating octagon head assembly 40.

In certain embodiments of the invention as depicted in FIGS. 1-3, the stabilizing mounting apparatus generally comprises base frame assembly 10, upper frame assembly 11, octagon head assembly 40 and camera mount assembly 100. Camera mount assembly 100 is configured to secure camera 170 thereon. In certain embodiments, the stabilizing mounting apparatus is disposed on a vehicle such as a cart, truck, other automobile or vehicle. In alternative embodiments, the stabilizing mounting apparatus is secured to a crane, dolly or other vehicle via octagon head assembly 40.

Base frame assembly 10 and upper frame assembly 11 of the stabilizing mounting apparatus are configured to absorb undesired and/or erratic movements during travel over bumps in the ground or other uneven terrain. This enhances stability of the secured camera 170 so that it can record a film and/or video with high image quality, even in the presence of the undesired and/or erratic movements encountered.

In certain embodiments as depicted in FIGS. 1-2, base frame assembly 10 of the stabilizing apparatus comprises a plurality of bars connected together including upper frame bars 22, upright bars 26, lower frame side bars 30 and crossbar 34. In one embodiment as depicted in FIG. 2, lower frame side bars 30 and crossbar 34 are connected together by a pair of lower tee connectors 32 to form an H-shaped base. In one embodiment, four upright bars 26 are coupled to the corner ends of the H-shaped base by elbow connectors 28. In one embodiment, each elbow connector 28 is a 90-degree elbow. However, elbow connectors 28 can have variable angles in alternative embodiments. In one embodiment, four upper frame bars 22 are connected together and coupled to the upper ends of upright bars 26 by 4-way tee connectors 24.

In certain embodiments as depicted in FIGS. 1-2, upper frame assembly 11 is coupled to base frame assembly 10 and comprises a plurality of support bars connected together including top bars 12 and extension bars 18. In one embodiment as depicted in FIG. 2, extension bars 18 comprise first ends that connect to upright bars 26 by 30-degree elbow connectors 20. It shall be appreciated that alternative angle elbow connectors can be used to connect extension bars 18 to upright bars 26 in alternative embodiments. In one embodiment, top bars 12 are connected together and coupled to extension bars 18 by a series of connectors including top elbow connectors 14 and top tee connectors 16. In an alternative embodiment, it shall be appreciated that any number of top bars 12 can be coupled together using connectors or be continuously connected together as a single bar.

In a preferred embodiment, the plurality of bars of base frame assembly 10 and the plurality of support bars of upper frame assembly 11 are preferably made from ½" diameter PVC pipes that can have variable lengths and thicknesses. In alternative embodiments, it shall be appreciated that the plurality of bars and support bars can be made from any alternative materials in the field. In one embodiment, glue or another adhesive is used to secure the bars and connectors in base frame assembly 10 and upper frame assembly 11 together.

In certain embodiments as depicted in FIGS. 1 and 3, octagon head assembly 40 is coupled to the top of upper frame assembly 11. In certain embodiments, octagon head assembly 40 generally comprises mounting bracket 52, top octagon plate 54, middle octagon plate 82, bottom octagon plate 86 and octagon base housing 88 coupled together. Octagon base housing 88 is coupled to top bars 12 of upper frame assembly 11 using a snap connection or friction-fit connection. In one embodiment, lower octagon wire connectors 90 and wire tray 92 are coupled to octagon base housing 88. Lower octagon wire connectors 90 and wire tray 92 are coupled together.

In certain embodiments, bottom octagon plate 86 is coupled to the top of octagon base housing 88 by mechanical fasteners. Lower threaded spindle 84 is coupled to the center of bottom octagon plate 86. Middle octagon plate 82 is disposed on bottom octagon plate 86 and comprises a central hole to permit lower threaded spindle 84 to pass therethrough. Wall 76 is coupled to middle octagon plate 82 and extends along the perimeter of the plate. Power plug connector 78 is coupled to wall 76 and is connected to a power source such as a battery or external power outlet. Middle octagon wire connectors 80 are coupled to wall 76.

In certain embodiments as depicted in FIG. 3, upper slip ring 58, upper spur gear 60, upper nut 64, upper inner box 74, upper washer 66, first upper bearing 68 and second upper bearing 70 are coupled together and operably connected to lower threaded spindle 84 within wall 76 and middle octagon plate 82. In one embodiment, upper spur gear 60 is coupled to lower threaded spindle 84 by screws or other fasteners. In one embodiment, first spindle motor 72 is mechanically coupled to upper inner box 74 within wall 76 and is electrically connected to power plug connector 78. Upper pinion gear 62 is operably connected to first spindle motor 72 and is engaged with upper spur gear 60.

In one embodiment as depicted in FIG. 3, top octagon plate 54 is coupled to the top of upper wall 76. Mounting bracket 52 is coupled to top octagon plate 54 by bracket bolts 48 and nuts 56. Other fasteners can be used in alternative embodiments. Upper threaded spindle 50 is coupled to the top of mounting bracket 52. Top ring 46 is disposed around upper threaded spindle 50 and is secured by spacers 44 and ring screws 42.

Figure 7:
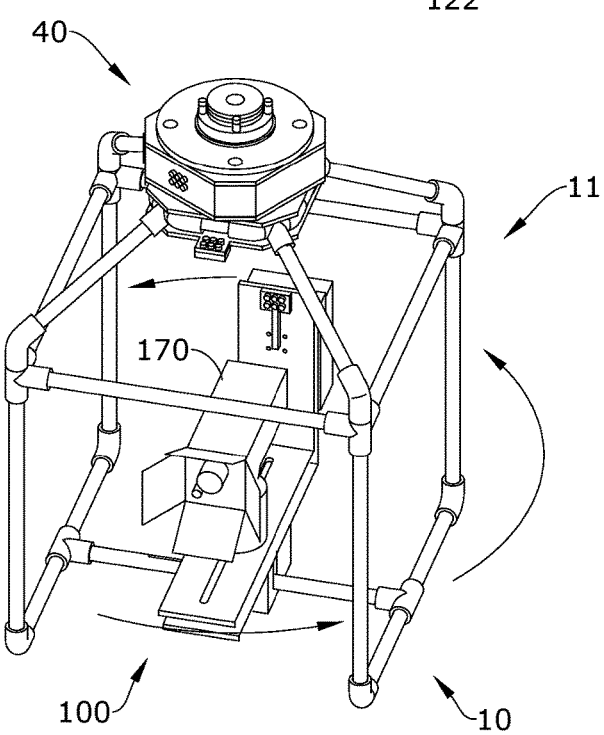
FIG. 7 depicts a perspective view of certain embodiments of the stabilizing mounting apparatus shown in use.

In certain embodiments as depicted in FIGS. 1 and 7, upper threaded spindle 50 and mounting bracket 52 are mechanically fastened to a vehicle (not shown) such as a dolly, crane or other vehicle. A joystick and/or remote computer is operably connected to first spindle motor 72 to enable or disable the motor. First spindle motor 72 is configured to drive upper pinion gear 62 and upper spur gear 60, which transfers rotational movement through the components housed within wall 76, top octagon plate 54 and middle octagon plate 82. This allows base frame assembly 10 and upper frame assembly 11 to rotate relative to the vehicle as depicted in FIG. 7.

Figure 4:
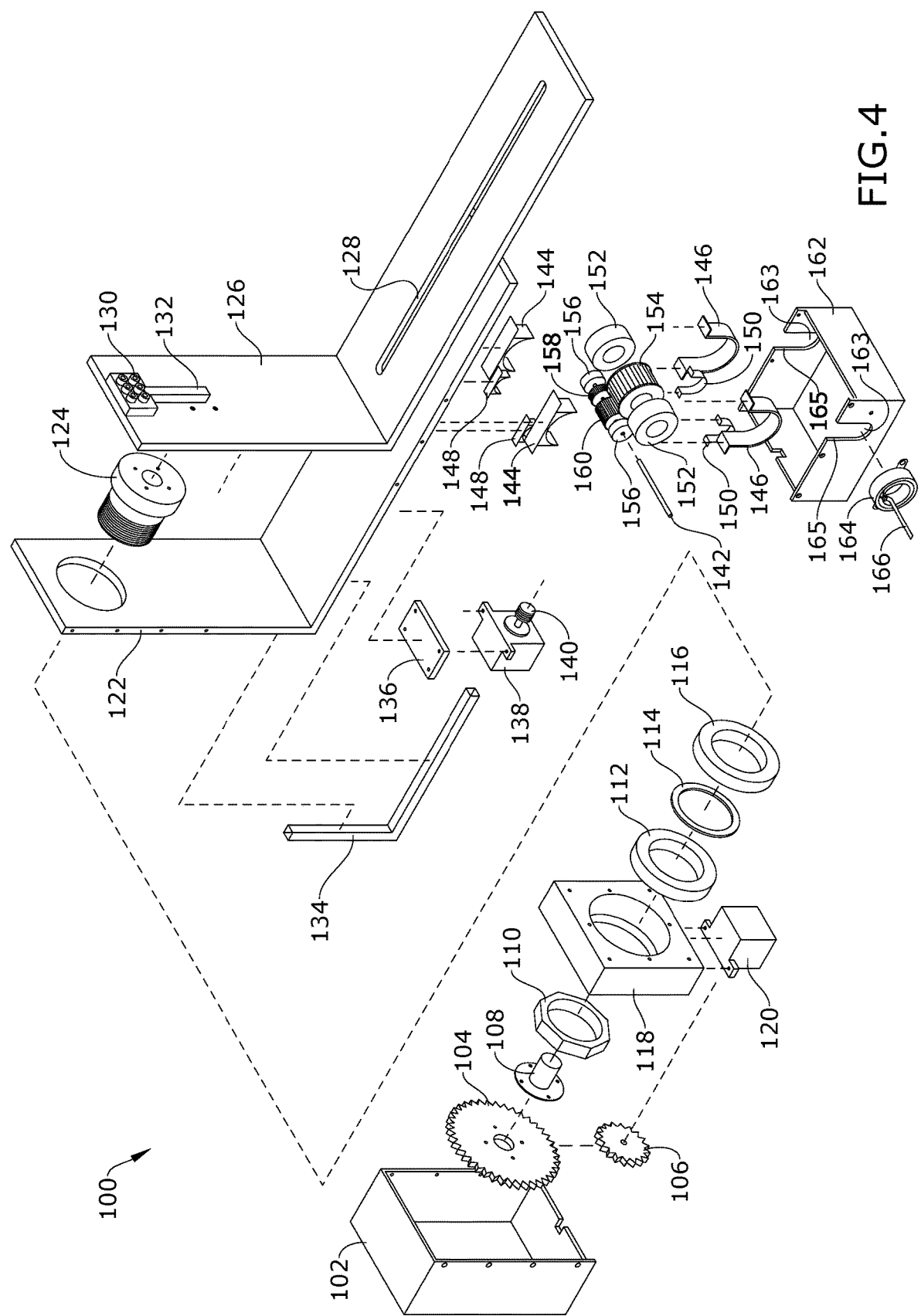
FIG. 4 depicts an exploded view of certain embodiments of the stabilizing mounting apparatus illustrating camera mount assembly 100.

In certain embodiments as depicted in FIGS. 1 and 4-6, camera mount assembly 100 is coupled to crossbar 34 of base frame assembly 10 and is configured to rotate a secured camera 170 in a 3-axis head camera configuration. In one embodiment as depicted in FIGS. 1 and 4, camera mount assembly 100 generally comprises outer L-bracket 122, inner L-bracket 126, second spindle motor 138, worm 140, large idler gear 154, large gear bearings 152, small gear bearings 156, worm gear 158, small idler gear 160, bottom cover 162 and alternate slip ring 164.

In one embodiment as depicted in FIGS. 1 and 4, crossbar 34 of base frame assembly 10 extends through alternate slip ring 164, holes 163 in bottom cover 162, large idler gear 154 and a pair of large gear bearings 152. Large idler gear 154 is coupled to crossbar 34 of base frame assembly 10 by screws or other fastening components. In one embodiment, bottom cover 162 comprises grooves 165 that are continuously connected to holes 163. Grooves 165 permit crossbar 34 and the components connected thereto to easily slide in and out of bottom cover 162.

In one embodiment as depicted in FIG. 4, axle 142 is disposed through small idler gear 160, worm gear 158, and the pair of small gear bearings 156. Axle 142 is mechanically fastened to small idler gear 160 using any type of fasteners. A pair of large bearing straps 146 and a corresponding pair of large bearing rests 144 are coupled together and configured to surround the pair of large gear bearings 152. The pair of large bearing rests 144 is coupled to the bottom of outer L-bracket 122 by mechanical fasteners or alternative fasteners. Similarly, a pair of small bearing straps 150 and a corresponding pair of small bearing rests 148 are coupled together and configured to surround the pair of small gear bearings 156. The pair of small bearing rests 148 is coupled to the bottom of outer L-bracket 122 by mechanical fasteners or alternative fasteners.

In one embodiment as depicted in FIG. 4, second spindle motor 138 is coupled to the bottom of outer L-bracket 122 by motor spacer 136 and mechanical fasteners. Alternative types of fasteners can be used. Second spindle motor 138 is electrically coupled to power plug connector 78, and a joystick and/or remote computer. In one embodiment, second spindle motor 138 comprises worm 140, which engages with worm gear 158 within bottom cover 162.

In certain embodiments as depicted in FIGS. 1 and 4, camera mount assembly 100 comprises rear cover box 102 coupled to outer L-bracket 122 by mechanical fasteners, which is configured to house lower spur gear 104, lower slip ring 108, lower nut 110, lower inner box 118, first lower bearing 112, lower washer 114 and second lower bearing 116. Lower spur gear 104, lower slip ring 108, lower nut 110, lower inner box 118, first lower bearing 112, lower washer 114 and second lower bearing 116 are operably connected together and positioned so that alternate threaded spindle 124 is mechanically fastened to lower spur gear 104 and lower slip ring 108.

In one embodiment as depicted in FIG. 4, alternate threaded spindle 124 extends through an opening in outer L-bracket 122 and is mechanically fastened to inner L-bracket 126. In one embodiment, third spindle motor 120 is mechanically coupled to lower inner box 118 and is electrically coupled to power plug connector 78. Lower pinion gear 106 is operably connected to third spindle motor 120 and is engaged with lower spur gear 104.

In one embodiment as depicted in FIGS. 1 and 4, camera 170 is secured to bracket slot 128 of inner L-bracket 126 using any mechanical fasteners or alternative fasteners. In one embodiment, bracket wire connectors 130 and wire track 132 are coupled to inner L-bracket 126. Bracket wire connectors 130 and wire track 132 are coupled together.

It shall be appreciated that power, audio and video feeds can be transmitted through wiring to camera 170, first spindle motor 72, second spindle motor 138 and third spindle motor 120 in a variety of configurations.

In one embodiment, a wire from power plug connector 78 and wires from middle wire connectors 80 corresponding to audio and video feeds are secured together inside top octagon plate 54, wall 76 and middle octagon plate 82. The secured wires travel together starting from octagon head assembly 40 to transmit power, audio feeds and video feeds through upper slip ring 58 to wire tray 92 and lower octagon wire connectors 90. The secured wires transmit power, audio feeds and video feeds from lower octagon wire connectors 90 to wire brace 166 of camera mount assembly 100 within alternate slip ring 164. The power wire can also run separate paths for the audio and video feed.

In one embodiment, the secured wires are coupled to any exterior portions of the bars in base frame assembly 10 and upper frame assembly 11 when transmitting power, audio feeds and video feeds from lower octagon wire connectors 90 to wire brace 166. The secured wires travel from wire brace 166 to the interior of bottom cover 162. An extension of the power wire inside bottom cover 162 connects to second spindle motor 138.

In one embodiment as depicted in FIG. 4, the secured wires transmitting power, audio feeds and video feeds continue from bottom cover 162 through L-shaped wire track 134, which is mechanically fastened to outer L-bracket 122. The secured wires from L-shaped wire track 134 travel to rear cover box 102 where an extension of the power wire connects to third spindle motor 120. The secured wires transmitting power, audio feeds and video feeds continue through lower slip ring 108 in rear cover box 102 and alternate threaded spindle 124 to wire track 132 and bracket wire connectors 130 on inner L-bracket 126. Wires transmitting power, audio feeds and video feeds connect bracket wire connectors 130 to camera 170.

Figure 5:
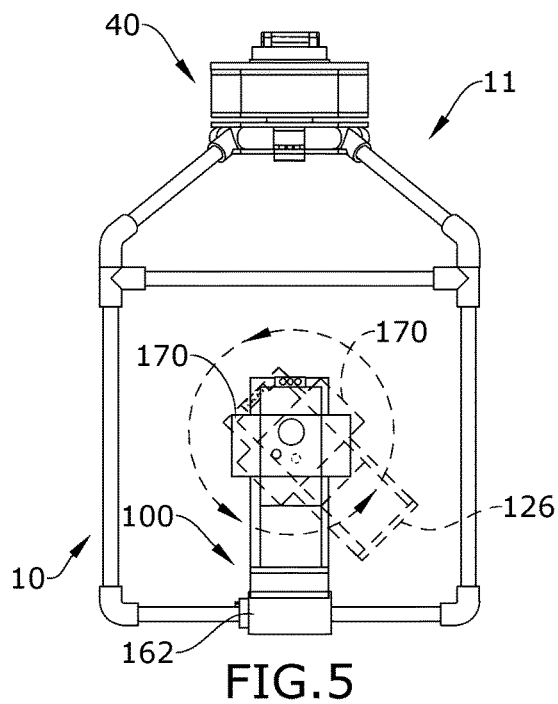
FIG. 5 depicts a front view of certain embodiments of the stabilizing mounting apparatus illustrating the rotation of camera 170.
Figure 6:
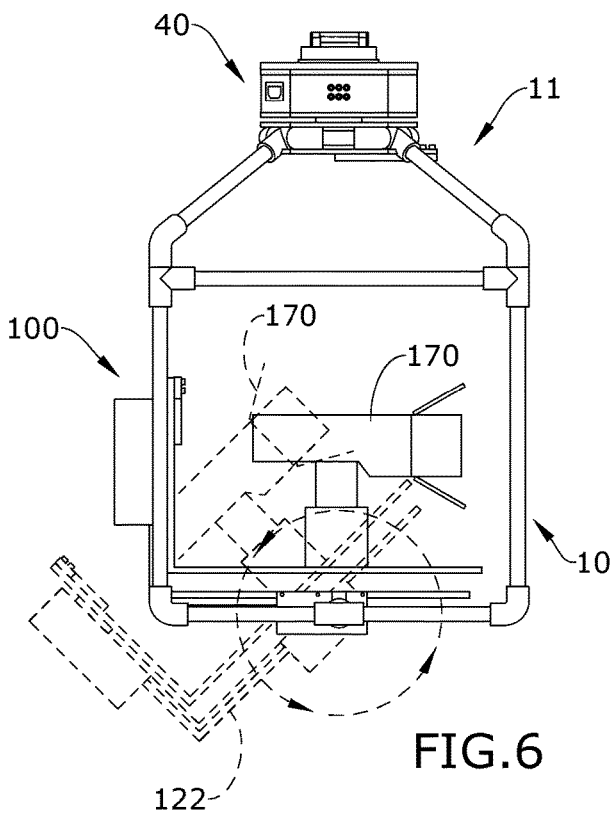
FIG. 6 depicts a side view of certain embodiments of the stabilizing mounting apparatus illustrating the rotation of camera 170.

In certain embodiments, second spindle motor 138 and third spindle motor 120 are operably connected to a joystick and/or remote computer. A user maneuvers the joystick and/or remote computer to control the operation of the second and third spindle motors. Enabling second spindle motor 138 allows worm 140 to drive worm gear 158, small idler gear 160 and large idler gear 154. The rotation of these gears in opposite directions allows L-brackets 122, 126 and secured camera 170 to rotate forward and back as depicted in FIG. 6. Enabling third spindle motor 120 drives lower pinion gear 106 and lower spur gear 104, which transfer rotational movement through the components housed within rear cover box 102. This rotational movement transfers through alternate threaded spindle 124, which rotates inner L-bracket 126 and secured camera 170 laterally as depicted in FIG. 5. As such, the use of second spindle motor 138, third spindle motor 120, outer L-bracket 122 and inner L-bracket 126 allows camera 170 to rotate in a 3-axis head camera configuration.

In an alternative embodiment, a single L-bracket 122 can be used to secure camera 170 in a 2-axis head camera configuration. In this embodiment, rear cover box 102 and the components secured therein are removed.

It shall be appreciated that the components of the stabilizing mounting apparatus described in several embodiments herein may comprise any known materials in the field and be of any color, size and/or dimensions. It shall be appreciated that the components of the stabilizing mounting apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A stabilizing mounting apparatus coupled to a camera to enhance image quality captured by the camera, the mounting apparatus configured to absorb undesirable movement resulting from travel on an uneven terrain to maintain the camera in a stable position, the stabilizing mounting apparatus comprising:

a base frame assembly comprising a plurality of bars coupled together, a first portion of the plurality of bars forming a H-shaped base and comprising a pair of side bars connected by a crossbar, a second portion of the plurality of bars comprising a plurality of upright bars comprising first ends and second ends, the first ends of the plurality of upright bars coupled to ends of the pair of side bars in the H-shaped base, and a third portion of the plurality of bars comprising a plurality of upper frame bars connected together and coupled to the second ends of the plurality of upright bars;

wherein the crossbar of the H-shaped base of the base frame assembly is configured to permit attachment of the camera thereto, wherein the plurality of bars in the base frame assembly are configured to absorb the undesirable movement from the travel to maintain the attached camera in the stable position;

an upper frame assembly coupled to the base frame assembly and comprising a plurality of support bars connected together, the plurality of support bars comprising a plurality of extension bars comprising first ends coupled to the second ends of the plurality of upper frame bars of the base frame assembly, and a plurality of top bars connected together and coupled to second ends of the plurality of extension bars;

wherein the first end in each upright bar in the plurality of upright bars is coupled to the H-shaped base by an elbow connector;

wherein the second end in each upright bar in the plurality of upright bars is coupled to an adjacent pair of upper frame bars in the plurality of upper frame bars by a 4-way tee connector wherein the first end of each extension bar in the plurality of extension bars is coupled to the second end of one of the plurality of upright bars by a 30 degree elbow.

2. The stabilizing mounting apparatus of claim 1, wherein the plurality of support bars in the upper frame assembly are connected together by connectors.

3. The stabilizing mounting apparatus of claim 2, further comprising a mounting bracket that secures the camera to the crossbar of the H-shaped base of the base frame assembly.

4. The stabilizing mounting apparatus of claim 3, further comprising at least one motor operably connected to the mounting bracket, the motor configured to rotate the camera relative to the crossbar of the H-shaped base.

5. The stabilizing mounting apparatus of claim 4, wherein the upper frame assembly is configured to attach to a dolly.

6. The stabilizing mounting apparatus of claim 4, wherein the upper frame assembly is configured to attach to a crane.

* * * * *